UNITED STATES PATENT OFFICE.

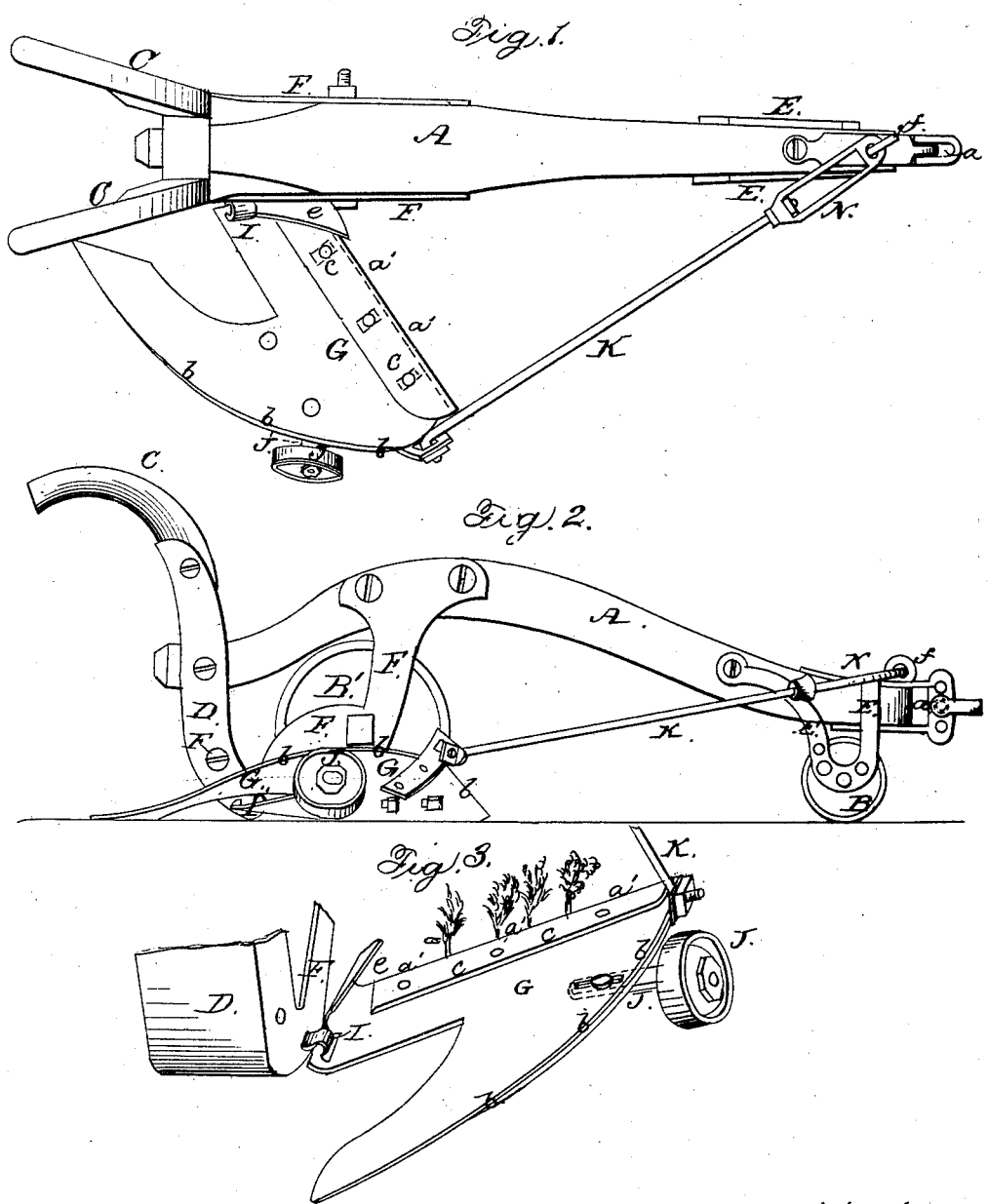

C. H. BURBIDGE, OF MIDDLETOWN, CONNECTICUT.

IMPROVEMENT IN COTTON-SCRAPERS.

Specification forming part of Letters Patent No. 30,718, dated November 27, 1860.

*To all whom it may concern:*

Be it known that I, C. H. BURBIDGE, of Middletown, in the county of Middlesex and State of Connecticut, have invented a new and useful Improvement in Cotton-Scrapers; and I do hereby declare that the following is a full, clear, and exact description thereof, reference being had to the accompanying drawings, making a part of this specification, in which—

Figure 1 is a plan view of the improved cotton-scraper. Fig. 2 is a side elevation of same. Fig. 3 is a perspective view of the scraping-wing and a portion of the frame to which it is pivoted.

Similar letters of reference indicate corresponding parts in the three figures.

This invention is an improvement in machines for scraping the weeds, &c., from the sides of the cotton-ridges, so that the cotton-plants will not be deprived of their proper nourishment by the grass which springs up with the first growth of the cotton.

My invention consists in attaching the scraping-wing to the standard of a plow-frame by a hinged joint, as will be hereinafter described, so that the wing will rise and fall and accommodate itself to the uneven surface of the ridge, thereby scraping the ridges in a better and more thorough manner than can be done with scrapers heretofore used.

To enable those skilled in the art to make and use my invention, I will proceed to describe its construction and operation.

A is a strong beam, which is supported at its front and rear ends on wheels B B', and guided by the handles C C, which handles are carried down below the rear end of the beam A and made to form the standard D, to which the scraper-plate G is hinged, as will be hereinafter described.

The front end of beam A is furnished with an ordinary clevis, $a$, which will admit of adjustment for changing the line of draft.

The front wheel, B, is pivoted to perforated curved plates E E, which are secured to and project down from the beam A. By removing the pivot which passes through the wheel B this wheel may be set closer to or farther from the beam A, so as to elevate or depress its front end to any desirable extent. The rear wheel, B', is not made adjustable like the front wheel. Its axle passes through plates F F, which are secured to the beam A and project down and are attached to the standard D, so as to form braces for this standard. The two wheels B B' have a very wide tread, and they should be kept as much as possible in the middle of the furrow between the ridges.

The scraper-plate G is made about the shape represented in Figs. 1 and 3. It has a straight edge, $a'$, and a curved and turned-up edge, $b$. The straight edge $a'$ has a knife-blade, $c$, secured to it, which knife may be made adjustable, so that its cutting-edge may be set in the most favorable position for cutting the weeds. The scraper-wing G is attached to the lower end of standard D by a simple hinge, I, (shown clearly in Fig. 3,) which hinge will allow the end of wing G to rise and fall. The cutting-edge $a'$ of the scraper G advances forward from the point where the scraper is hinged to the standard D, so as to cut the weeds with a shear cut and to throw the weeds over on the scraper-wing, whence they fall back into the middle of the furrow, behind the standard D.

The outer curved edge, $b$, will prevent the weeds from slipping back on the surface of the ridge again.

J is a small wheel, which is on the end of an adjustable bar, J', which bar will allow the wheel J to be set forward or backward, according to the degree of inclination which the scraper takes in its movement over the sides of the cotton-ridges. The wheel J is intended to support the scraping-wing G at its farthest end from the standard D, so that there will be as little friction as possible on the bottom of the wing G.

That portion of the scraper-wing G which is turned up (and lettered $e$ in Figs. 1 and 3) is intended to serve as a guard to prevent the cut weeds from falling in front of the standard D and forming an obstruction to the machine.

In consequence of the length of the scraping-wing G it becomes necessary to brace this wing with a rod, K, which rod is pivoted in a secure manner to the extreme outer end of the wing G, and carried forward from this end of the wing to the front end of the beam A and connected to an eye, $f$, by a swivel coupling-link, N, which link will allow the scraping-wing G to rise and fall.

The object of giving the brace-rod K such a long reach is to control as much as possible the side draft on the scraping-wing occasioned by extending the wing G so far from one side of the plow-frame.

The operation of the above-described machine for scraping cotton-ridges is as follows: Animals are attached to the beam in front, and the handles C C are controlled by the driver. The wheels B B' are kept in the middle of the furrow between two rows of cotton, and the scraping-wing G lies on the inclined ridge on one side of the furrow. The knife $c$ is adjusted by moving it forward or backward on the wing G, so that it will cut the weeds to the best advantage, and the wheel J is adjusted so that it will run as near as possible with the line of draft. As the machine is drawn along between the cotton-rows the scraping-wing G will rise and fall with the uneven surface of the ridge, and the cutting-edge of knife $c$ will be kept well down to the roots of the weeds, and the weeds will be cut by the knife $c$ and thrown down behind the standard in consequence of the inclined position of the scraping-wing, where they will be left to dry and rot.

The cutting-edge $a'$ is not intended to dig down below the surface of the ridges, but only to skim along the surface and scrape off the weeds in a more perfect manner than can be done with scrapers having their wings attached rigidly to the plows or frames.

Having thus described my invention, what I claim as new, and desire to secure by Letters Patent, is—

Attaching the scraping-wing of a cotton-scraper to a suitable carriage or plow-frame by a hinged joint and a pivoted brace-rod, K, so as to allow said scraping-wing to rise and fall with the uneven surface of the ridges, substantially as herein set forth.

C. H. BURBIDGE.

Witnesses:
ALBERT ATKINS,
JONATHAN BARNES.